United States Patent
Kajitani et al.

[11] Patent Number: 5,823,880
[45] Date of Patent: *Oct. 20, 1998

[54] DUAL FLYWHEEL ASSEMBLY WITH LOCKUP MECHANISM BETWEEN TWO FLYWHEELS

[75] Inventors: Koji Kajitani; Hiroshi Mizukami, both of Neyagawa, Japan

[73] Assignee: EXEDY Corporation, Osaka, Japan

[*] Notice: The term of this patent shall not extend beyond the expiration date of Pat. No. 5,816,924.

[21] Appl. No.: 885,883

[22] Filed: Jun. 30, 1997

[30] Foreign Application Priority Data

Jul. 10, 1996 [JP] Japan .................................. 8-180942

[51] Int. Cl.$^6$ ........................................................ F16D 3/12
[52] U.S. Cl. ........................... 464/66; 192/201; 192/212; 464/68
[58] Field of Search ................................ 464/63, 64, 66, 464/68; 192/201, 212; 74/574

[56] References Cited

U.S. PATENT DOCUMENTS

| | | | |
|---|---|---|---|
| 3,296,887 | 1/1967 | Larsen | 192/201 |
| 4,433,770 | 2/1984 | Loizeau et al. | 464/68 |
| 4,576,267 | 3/1986 | Loizeau | 192/201 |
| 4,620,621 | 11/1986 | Kulczycki et al. | 192/201 |
| 4,679,678 | 7/1987 | Habel, Jr. et al. | 192/212 |
| 4,702,721 | 10/1987 | Lamarche | 464/66 |
| 4,747,801 | 5/1988 | Chasseguet et al. | 464/66 |
| 4,903,821 | 2/1990 | Fischer et al. | 464/63 |
| 5,697,845 | 12/1997 | Curtis | 464/68 |

*Primary Examiner*—Eileen A. Dunn
*Attorney, Agent, or Firm*—Shinjyu An Intellectual Property Firm

[57] ABSTRACT

A first flywheel and a second flywheel in a flywheel assembly are configured to be connected to each other such that they rotate together with generally no relative rotation therebetween in a predetermined low RPM region. The flywheel assembly (1) includes the first flywheel (2), the second flywheel (3), a damper mechanism (5) and a lever mechanism (7). The second flywheel (3) is disposed rotatable relative to the first flywheel (2). The damper mechanism (5) elastically connects the first flywheel (2) and the second flywheel (3) to allow for limited relative rotary displacement therebetween. The lever mechanism (7) is mounted on the first flywheel (2) and pivots about a pivot bolt connected to the first flywheel (2). The lever mechanism (7) pivots between an engaged state and a disengaged state. In the engaged state, the lever mechanism (7) connects the first flywheel (2) and the second flywheel (3) such that the two flywheels may not undergo relative rotary displacement with respect to each other.

15 Claims, 4 Drawing Sheets

DUAL FLYWHEEL ASSEMBLY WITH LOCKUP MECHANISM BETWEEN TWO FLYWHEELS

BACKGROUND OF THE INVENTION

1. Field of the Invention

The present invention relates to a flywheel assembly, and more particularly to a flywheel assembly having two flywheels in which a damper mechanism is interposed between the two flywheels.

2. Description of the Related Art

A flywheel is mounted to a crankshaft of an engine. The inertial mass of the flywheels serves to reduce the rotational vibration during operation of the engine at low speeds. Also, a starting ring gear, a clutch and the like are typically mounted on the flywheel.

A flywheel assembly is well known in which the flywheel is divided into a first flywheel and a second flywheel with a damper mechanism being interposed therebetween. The damper mechanism interposed between the first and second flywheels includes an elastic member disposed so as to be compressible in the circumferential direction when the two flywheels undergo relative rotary displacement with respect to each other. Also, there are some damper mechanisms which are provided with a friction generating mechanism which acts in parallel with the elastic member to produce a hysteresis dampening effect.

Noise and vibration problems are often produced by the drive power transmission system of vehicles and are caused by the drive train gear engagement and engagement and interaction between other mechanical portions the drive train when the vehicle is in operation. In order to reduce the noise and vibration, it is desirable to set a resonance frequency of the drive train system at a level lower than the RPM range of the engine at idling speeds by reducing torsional rigidity in the acceleration/deceleration torque ranges as much as possible. In order to reduce the torsional rigidity in the damper mechanism, there are some damper mechanism configurations where the angle displacement of the elastic member is enlarged, or a plurality of elastic members are arranged so as to act in series with each other.

On the other hand, in the above-described two-divided flywheel assembly, when the engine is started and the engine is stopped, the engine speed passes through the resonance frequency in the low RPM regions (for example, 500 RPM or less). In this case, there is a possibility that an excessively large torque variation could occur, resulting in damage to the damper mechanism or the generation of noticeable noise/vibration. In order to overcome these problems, as proposed in Japanese Patent Application Laid-Open No. Hei 5-18440, a locking mechanism is provided such that in the low RPM region, the first flywheel and the second flywheel are locked with each other for unitary rotation. However, in the higher RPM region, the locking of the two members is released to thereby bring the damper mechanism into an operable condition. The interlocking mechanism shown in Japanese Patent Application Laid-Open No. HEI 5-18440 includes a locking member for interlocking the two flywheels and an elastic member for biasing the locking member to the lock position. The locking member an arcuate shaped member disposed in two corresponding recesses, a first recess in the first flywheel and a second recess formed in the second flywheel. The locking member and the recesses are configured such that the locking member may move in a radially between a radially inward position and a radially outward position. In the radially outward position, the locking member is completely disposed in the first recess of the first flywheel. In the radially inward position, the locking member extends into the second recess of the second flywheel and partially extends into the first recess of the first flywheel, thus locking the two flywheels together. A spring biases the locking member in a radially inward position. In a low RPM region, the locking member is biased radially inward by the spring and the two flywheels are lock together. When the engine is rotating in a high RPM region, the locking member is moved radially outwardly by the centrifugal force to overcome the biasing force of the elastic member, thus unlocking the two flywheels. In the flywheel assembly disclosed in Japanese Patent Application Laid-Open No. HEI 5-18440, the recesses which retain the locking member are formed in the two flywheels. Due to the formation of these engagement portions, the structure of the overall assembly is complicated and manufacturing cost may be high. The locking member also may have a short service life due to the repeated application of the torque thereto. As well, the mechanism appears to have low reliability. Furthermore, while in the lock position, the locking member is engaged and retained by the two flywheels and therefore there are circumstances, such as constant acceleration conditions, where the locking a member is unable to move to the radially outward, disengaged position.

SUMMARY OF THE INVENTION

One object of the present invention is to provide a flywheel assembly in which a first flywheel and a second flywheel may be engaged with one another to restrict relative rotation therebetween primarily in a low RPM range.

Another object of the present invention is to provide a flywheel assembly in which a first flywheel and a second flywheel may be engaged with one another to restrict relative rotation therebetween primarily in a low RPM range a structure high in reliability.

In accordance with one aspect of the present invention, flywheel assembly includes a first flywheel and a second flywheel disposed adjacent to the first flywheel and configured to undergo limited relative rotary displacement with respect to the first flywheel. An elastic member is disposed between the first and second flywheels limiting relative rotary displacement between the first and second flywheels. A lever mechanism is mounted on the first flywheel for pivotal movement with respect to the first flywheel, the lever mechanism being configured to be disengaged from the second flywheel in response to centrifugal force with the first and second flywheels rotating above a predetermined RPM range. In response to a predetermined amount of relative rotary displacement between the first and second flywheels in a first direction, the lever mechanism is configured to engage a portion of the second flywheel such that further relative rotary displacement between the first and second flywheel in the first direction is prevented.

In accordance with an other aspect of the present invention, the lever mechanism is configured to be disengaged from the second flywheel in response to centrifugal force with the first and second flywheel rotating above a predetermined RPM range. In response to a predetermined amount of relative rotation between the first flywheel and the driven plate, a portion of the lever mechanism engages a cam surface causing the lever mechanism to engage a portion of the second flywheel such that the first and second flywheel are connected such that relative rotation therebetween is restrained.

These and other objects, features and advantages of the present invention will become more fully apparent from the following detailed description taken with the accompanying drawings.

DETAILED DESCRIPTION OF THE PREFERRED EMBODIMENTS

Figure 1:
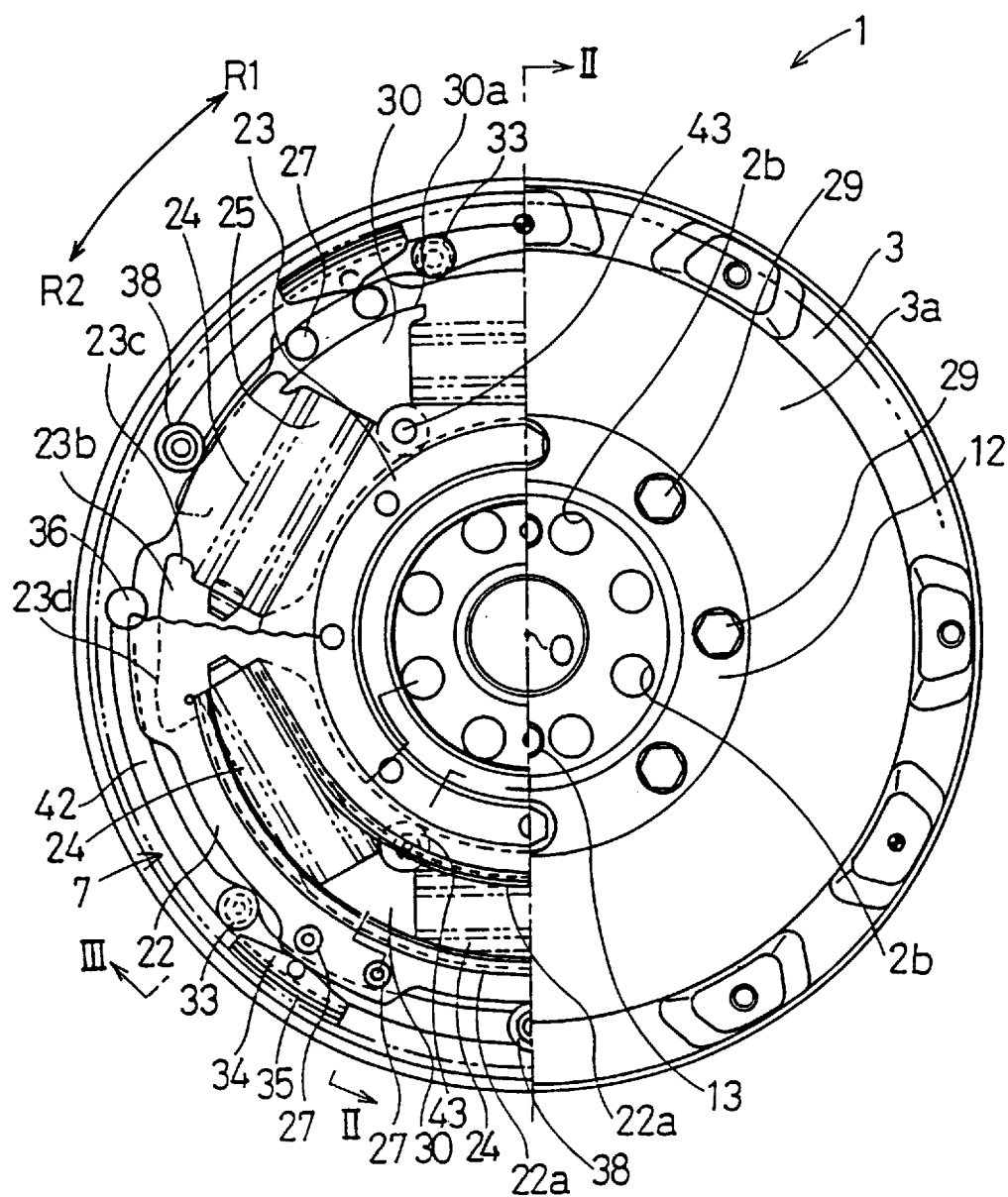
FIG. 1 is a part elevation, part cutaway view showing a flywheel assembly in accordance with one embodiment of the present invention.
Figure 2:
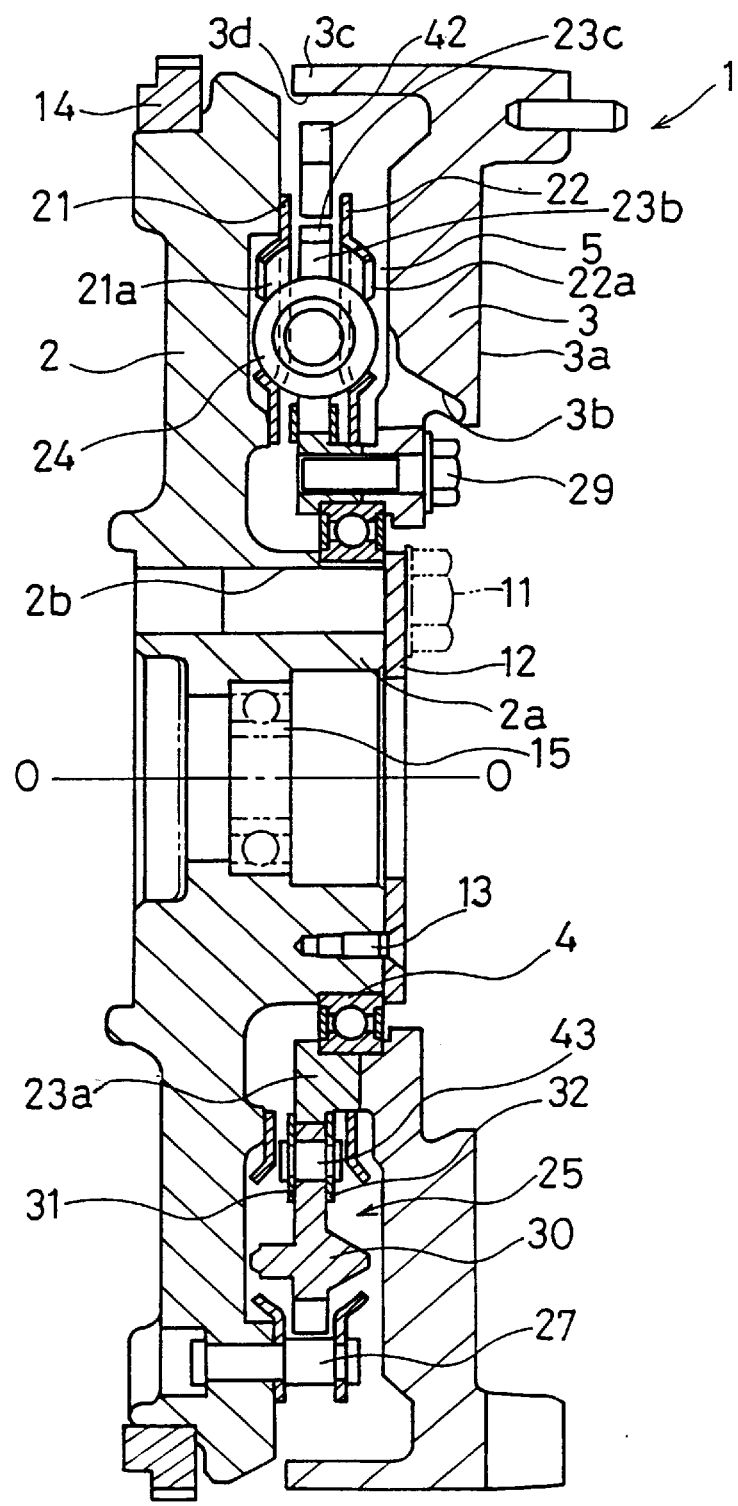
FIG. 2 is a cross-sectional view of the flywheel assembly taken along the line II—II of FIG. 1.
Figure 3:
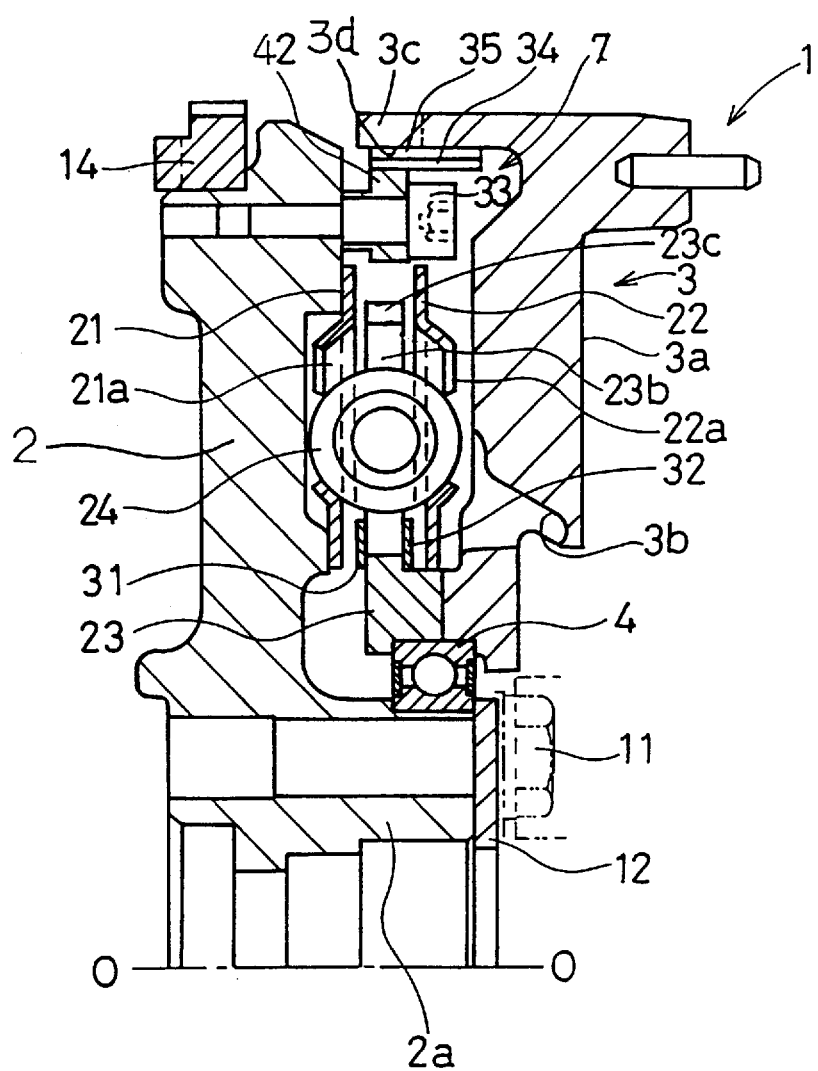
FIG. 3 is a partial cross-sectional view of the flywheel assembly taken along the line III—O of FIG. 1.

FIGS. 1, 2, 3, 4 and 5 show a flywheel assembly 1 in accordance with one embodiment of the invention. The flywheel assembly 1 is configured to be mounted to a crankshaft (not shown) of an engine (not shown), and serves to transmit torque to a transmission through a clutch device (not shown) that may be attached to the flywheel assembly. With reference now to FIG. 2, the unillustrated engine would be disposed to the left of the flywheel assembly 1 and therefore, hereinafter, the left side of FIG. 2 will be referred to as the engine side. The transmission (not shown) would be disposed to the left side of the flywheel assembly 1 in FIG. 2 and therefore, the right side of FIG. 2 will hereinafter be referred to as the transmission side.

The flywheel assembly 1 includes a first flywheel 2, a second flywheel 3, a damper mechanism 5 and several lever mechanisms 7.

The first flywheel 2 is a disc-like member which has, in a central portion thereof, a sleeve-like central boss 2a extending toward the transmission side. Holes are formed in the central boss 2a through which crank bolts 11 are inserted. A bearing 15 is fixed to an inner circumferential surface of the central boss 2a. The bearing 15 serves to relatively rotatably support a tip end of a main drive shaft (not shown) extending from the transmission side. A bearing, 4 is fixed to an outer circumferential surface of the central boss 2a. In order to retain the bearing 4, a disc-like fastening plate 12 is fixed to the end of the central boss 2a by bolts 13. A ring gear 14 is fixed to an outer circumference of the first flywheel 2.

The second flywheel 3 is a disc-like member having an inner diameter that is larger than the inner diameter of the first flywheel 2. The inner circumferential portion of the second flywheel 3 is supported on the central boss 2a of the first flywheel 2 through the bearing 4, thus allowing relative rotation between the first flywheel 2 and the second flywheel 3.

A flat frictional surface 3a is formed on the transmission side of the second flywheel 3. Furthermore, a plurality of air holes 3b are formed radially inward from the frictional surface 3a. The air holes 3b penetrate the second flywheel 3 in the axial direction. A cylindrical projecting portion 3c extending toward the engine side, i.e., toward the first flywheel 2, is formed on a radially outward circumferential portion of the second flywheel 3. The inner circumferential surface of the cylindrical projecting portion 3c defines a frictional surface 3d.

The damper mechanism 5 is disposed in a space defined between the first flywheel 2 and the second flywheel 3. The damper mechanism 5 connects the first flywheel 2 and the second flywheel 3 to each other limiting relative rotary displacement with respect to each other within a predetermined angular displacement range. The damper mechanism 5 includes a first drive plate 21, a second drive plate 22, a driven plate 23, a plurality of coil springs 24 and a float member mechanism 25. The first drive plate 21 and the second drive plate 22 are disc-like members, respectively, and disposed at a predetermined interval in the axial direction. The outer circumferential portions of the first drive plate 21 and the second drive plate 22 are fixed to the first flywheel 2 by a plurality of rivets 27. The axial distance between the first drive plate 21 and the second drive plate 22 is maintained by the rivets 27. Window holes 21a and 22a extending in the axial direction are formed in radial intermediate portions of the first drive plate 21 and the second drive plate 22. Cut-out portions 21b and 22b are formed on either side the radial direction of the three window holes 21a and 22a.

The driven plate 23 is a disc-like member disposed between the first drive plate 21 and the second drive plate 22. A boss 23a is formed on the driven plate 23 and extends axially toward the transmission side. The driven plate 23 has bolt holes is formed in an inner circumferential portion thereof which extend through the axial width of the driven plate 23. Bolts 29 are threadedly engaged with the bolt holes of the boss 23a through holes formed in the inner circumferential portion of the second flywheel 3 from the transmission side. The driven plate 23 is fixed to the second flywheel 3 by the bolts 29. The inner circumferential surface of the driven plate 23 is therefore fixed to the second flywheel 3. Window holes, corresponding to the window holes 21a and 22a of the first and second drive plates 21 and 22, are formed in the driven plate 23 between support portions 23b. The window holes have no outer edges and are opened radially outwardly. The shape of these windows is defined by the three support portions 23b which extend radially outwardly are formed in the driven plate 23. The circumferential spaces between the three support portions 23b in the circumferential direction define the above-described windows. The support portions 23b have a shape similar to the letter T, with limit portions 23c formed on the radially outer most portions of the support portions 23b. The limit portions 23c extend circumferentially to partially enclose the above described windows. A cam surface 23d that gradually increases in level radially outwardly as it goes toward an R2 direction is formed on the outer circumferential edge of the support portion 23b.

Paired coil springs 24 are disposed within each window hole of the driven plate 23 and window holes 21a and 22a of the first and second drive plates 21 and 22. The pair of coil springs 24 extend generally linearly (the coil springs 24 are generally straight and have no noticeable curvature along their axial length) in a direction tangent a circumference of the driven plate 23. The coil springs 24 could each be a single coil spring. However, each of the respective coil springs 24 could alternatively include a pair of coaxial coil springs having a large diameter and a small diameter. However, even though each coil spring 24 could includes two coaxial springs, for convenience, each of the coaxial springs 24 will be referred to as a single coil spring 24.

The float mechanism 25 is interposed between adjacent coil springs 24 disposed in each window hole. The float mechanisms 25 are intermediate joint mechanisms for transmitting the torque between the two coil springs 24. The float member mechanism 25 is formed by three float members 30 and a pair of annular plates 31, 32. Each of the float members 30 is interposed between the two coil springs 24 within each window hole. The float members 30 are fan-shaped such that the float members is centrally disposed in the window hole between adjacent support portions 23b in a torsion free state. The radial outermost portions of the float members 30 extend circumferentially to define limit portions 30a. The limit portions 30a limit the radially outward movement of both the coil springs 24. As shown in FIG. 2, each float member 30 has projections extending axially from either side thereof for contact with end faces of the coil spring 24.

The float mechanism 25 also includes the pair of annular plates 31 and 32. Each of the float members 30 are interposed between the two coil springs 24 in each window. Each of the float member 30 is sector-shaped in a manner similar to that of each of the support portions 23b so that the circumferential width is increased in a radially outward edge. The two annular plates 31 and 32 are disposed axially between the inner circumferential portions of the first and second drive plates 21 and 22 such that the plates 31 and 32 are disposed on either axial side of the float members 30. The radially inward end of each of the float members 30 is swingably fixed to the annular plates 31 and 32 by a rivet 43.

The inner circumferential edges of the annular plate 32 and the second drive plate 22 are in contact with the outer circumference of the boss 23a of the driven plate 23 but may undergo limited relative rotary displacement relative thereto.

The lever mechanism 7 is a mechanism for selectively mechanically connecting the first flywheel 2 and the second flywheel 3 such that, while engaged, the lever mechanism 7 does not allow for free relative rotation between the first and second flywheels 2 and 3. There are three lever mechanisms 7 are arranged at regular intervals in the circumferential direction between the first and second flywheels 2 and 3 in the axial direction. Details of the lever mechanisms 7 are shown in greater detail in FIGS. 3, 4 and 5. All three lever mechanisms 7 are generally the same and therefore explanation will only be provided for one of the lever mechanisms 7, but apply to all three.

Figure 4:
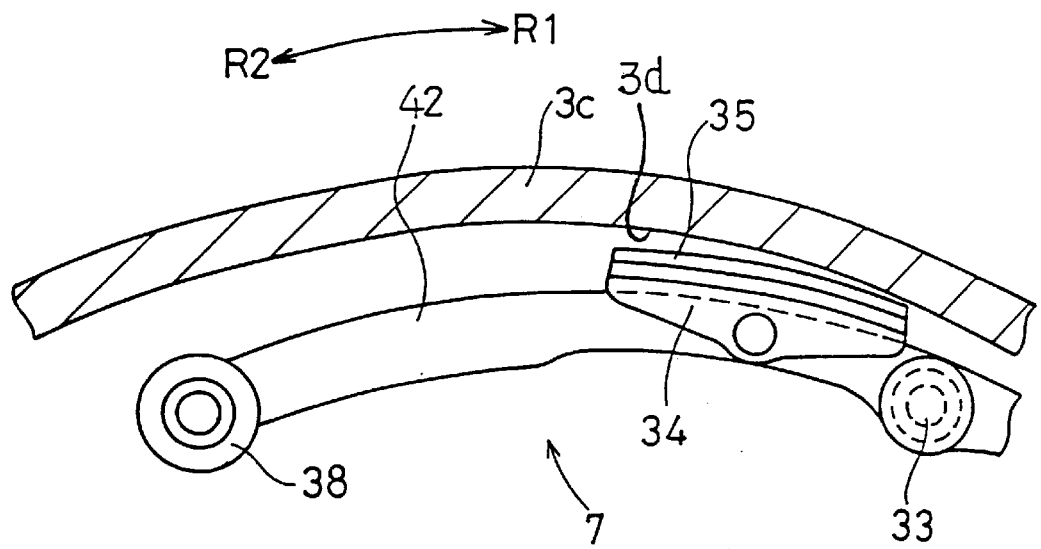
FIG. 4 is a fragmentary, part cross-section, part plan view of the flywheel assembly showing details of a lever mechanism in a dis-engaged position.
Figure 5:
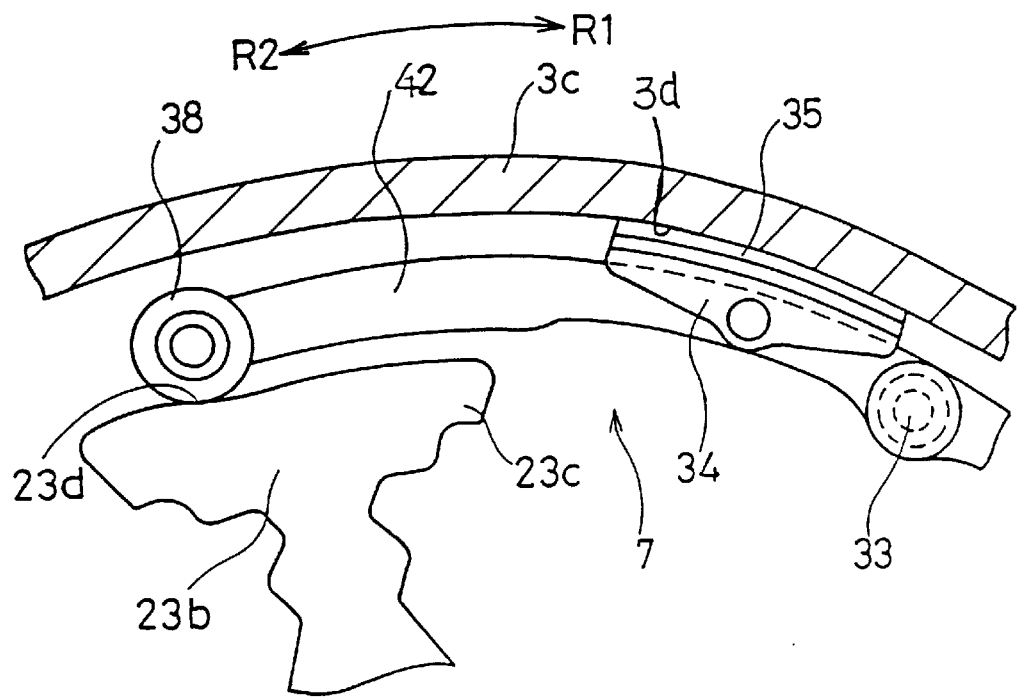
FIG. 5 is a fragmentary, part cross-section, part plan view of the flywheel assembly showing details of the lever mechanism in an engaged state.

The lever mechanism 7 is mainly composed of a lever 42 having an arcuate shape. The lever 42 is formed with an aperture through which a bolt 33 extends. The bolt 33 further extends into the first flywheel 2. The lever 42 is pivotable about the bolt 33, the bolt 33 defining a fulcrum. The fulcrum defined by the bolt 33 is generally positioned centrally in the lever 42, but may also be positioned off center. A roller 38 is mounted to a first end of the lever 42, spaced apart from the bolt 33. An inertia mass member 36, shown in FIG. 1, is mounted to a second end of the lever 42. A frictional clutch 34 is fixed to the lever 42 slightly spaced apart from the bolt 33, as shown in FIGS. 4 and 5. The frictional clutch 34 is connected to the lever 42 on the R2 side of the lever 42, with respect to the pivot bolt 33, as shown in FIGS. 4 and 5.

The frictional clutch 34 faces the frictional surface 3d formed in the inner circumferential surface of the cylindrical projecting portion 3c of the second flywheel 3. Furthermore, a frictional member 35 is fixed to the frictional clutch 34 such that the frictional member 35 faces the frictional surface 3d for selective engagement therewith. The frictional clutch 34 and the frictional member 35 have an arcuate surface corresponding in shape to the inner circumferential surface of the cylindrical projection portion 3c.

The operation of the flywheel assembly 1 will now be described.

When the engine (not shown) is started, torque is transmitted from the crankshaft to the first flywheel 2. Torque is transmitted from the first flywheel 2 to the second flywheel 3 through the damper mechanism 5. If excessive large toque variations occur as the rotational speed of the engine passes the resonant point in the low rotation region (for example, 0 to 500 RPM), the first flywheel 2 and the second flywheel 3 undergo relative rotary displacement. At that time, in the damper mechanism 5, the coil springs 24 are compressed, and a displacement angle between the drive plates 21, 22 and the driven plate 23 increases. As displacement occurs, the roller 38, which is contact with the cam surface 23d, is urged radially outward by the cam surface 23d. In other words, as relative rotation occurs between the first flywheel 2 and the driven plate 23, the support portion 23b of the driven plate 23 also undergoes rotational movement with respect to first flywheel 2. The lever mechanism 7 is fixed to the first flywheel 2 by the bolt 33 and therefore, the lever mechanism 7 rotates with respect to the support portion 23b and the roller on the lever 42 moves with respect to the cam surface 23d. Movement of the lever 42 causes the frictional member 35 to engage the frictional surface 3d of the cylindrical projecting portion 3c of the second flywheel 3 and thus, the first flywheel 2 and the second flywheel 3 become engaged with one another such the first and second flywheels 2 and 3 no longer rotate with respect to one another. As a result, possible damage to the damper mechanism 5 and the like, or the noise/vibration is minimized.

The disengagement and engagement states of the lever mechanism 7 are described below. In the state shown in FIG. 4, the lever mechanism is in a disengaged state such that the first flywheel 2 and the second flywheel 3 may under go limited relative rotary displacement with respect to one another. As rotational speeds increase, the inertia mass member 36 is moved radially outwardly by centrifugal forces thus preventing the frictional clutch 34 from moving toward the frictional surface 3d of the cylindrical projecting portion 3c. If the first and second flywheels 2 and 3 do undergo relative rotary displacement and displacement between the drive plates 21, 22 and the driven plate 23 is in excess of a predetermined torsional angle , for example, as shown in FIG. 5, the support portion 23b of the driven plate 23 is moved in the R1 rotation direction with respect to the lever mechanism 7 such that the cam surface 23d of the support portion 23b engages the roller 38 and moves the roller radially outward. The rotation of the roller 38 assures smooth operation and movement of the lever mechanism 7. As a result, the frictional member 35 of the frictional clutch 34 is pressed to the frictional surface 3d of the cylindrical projecting portion 3c via the lever 42. In the present invention, the force applied to the frictional clutch 34 to the cylindrical projecting portion 3c by the cam surface 23d is a function of the distance between the bolt 33 and the frictional clutch 34, and the distance between the bolt 33 and the roller 38. Thus, a large force may be obtained by the lever mechanism 7 for the positive connection between the first flywheel 2 and the second flywheel 3.

When the rotation of the engine is increased (for example, exceeding 500 RPM), the torque of the first flywheel 2 is transmitted to the second flywheel 3 via the damper mechanism 5. Since the three pairs of series connected coil springs 24 provided in the damper mechanism 5, the torsional rigidity is decreased and at the same time, the torsional angle is increased. For this reason, it is unnecessary to provide a friction resistance generating mechanism such as that in prior art configurations, and it is possible to attenuate the torsional vibration with a small amount of frictional resistance generated between the respective components. As a result, it is possible to reduce the drive system sounds during the travel.

In the flywheel assembly according to the present invention, at the time of passing the resonant point in the low rotation region, since the torsional angle between the first flywheel and the second flywheel is increased due to the excessive large toque variation and the lock mechanism connects the both flywheels to be unrotatable relative to each other, the damage of the elastic connection portion and the like, or the noise/vibration at the time of resonant would hardly occur.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A flywheel assembly comprising:
    a first flywheel;
    a second flywheel disposed adjacent to the first flywheel and configured to undergo limited relative rotary displacement with respect to said first flywheel;
    an elastic member disposed between said first and second flywheels limiting relative rotary displacement between said first and second flywheels; and
    a lever mechanism mounted on said first flywheel for pivotal movement with respect to said first flywheel, said lever mechanism being configured to be disengaged from said second flywheel in response to centrifugal force with said first and second flywheels rotating above a predetermined RPM range; and
    wherein in response to a predetermined amount of relative rotary displacement between said first and second flywheels in a first direction, said lever mechanism is configured to engage a portion of said second flywheel such that further relative rotary displacement between said first and second flywheel in said first direction is prevented.

2. The flywheel assembly according to claim 1, further comprising a driven plate connected to said second flywheel for rotation therewith, a portion of said driven plate being formed with a cam surface configured to engage a portion of said lever mechanism in response to said predetermined amount of relative rotary displacement between said first and second flywheels in said first direction.

3. The flywheel assembly according to claim 2, wherein said lever mechanism further comprises a frictional clutch for coupling said first flywheel and said second flywheel to each other.

4. The flywheel assembly according to claim 3, wherein:
    said lever mechanism includes a lever attached to said first flywheel by a pin, said pin defining a fulcrum about which said lever pivots, an inertial mass is attached to a first end of said lever spaced apart from said fulcrum, a roller is attached to a second end of said lever spaced apart from said fulcrum and said frictional clutch is attached to said lever at a point spaced apart from said fulcrum between said fulcrum and said second end; and
    said second flywheel is formed with a circumferentially extending inner surface, said frictional clutch faces said inner surface of said second flywheel.

5. The flywheel assembly according to claim 4, wherein said inner surface of said second flywheel is defined on an annular lip which extends axially from said second flywheel.

6. The flywheel assembly according to claim 5, further comprising:
    a pair of drive plates fixed to said first flywheel, said drive plates being spaced apart from each other and formed with engagement portions;
    said driven plate is disposed between said drive plates having a plurality of radially extending support portions formed thereon; and
    wherein said elastic member comprises a plurality of elastic members disposed between adjacent ones of said radially extending support portions and said engagement portions.

7. The flywheel assembly according to claim 6, further comprising:
    a float body mounted between said first and second flywheels for relative rotary displacement with respect to both said first and second flywheels, said float body extending radially outward between adjacent elastic members such that said two adjacent elastic members extend between said radially extending support portions with said float body separating said two adjacent elastic members.

8. The flywheel assembly according to claim 7, wherein said float body and said radially extending support portions are formed at radial outward portions with circumferentially extending limiting portions.

9. A flywheel assembly comprising:
    a first flywheel;
    a second flywheel disposed adjacent to the first flywheel and configured to undergo limited relative rotary displacement with respect to said first flywheel;
    a driven plate connected to said second flywheel for rotation therewith, a portion of said driven plate being formed with a cam surface;
    an elastic member disposed between said first and second flywheels limiting relative rotary displacement between said first and second flywheels; and
    a lever mechanism mounted on said first flywheel for pivotal movement with respect to said first flywheel, said lever mechanism being configured to be disengaged from said second flywheel in response to centrifugal force with said first and second flywheels rotating above a predetermined RPM range; and
    wherein in response to a predetermined amount of relative rotation between said first flywheel and said driven plate, a portion of said lever mechanism engages said cam surface causing said lever mechanism to engage a portion of said second flywheel such that said first and second flywheel are connected such that relative rotation therebetween is restrained.

10. The flywheel assembly according to claim 9, wherein said lever mechanism further comprises a frictional clutch for coupling said first flywheel and said second flywheel to each other.

11. The flywheel assembly according to claim 10, wherein:
    said lever mechanism includes a lever attached to said first flywheel by a pin, said pin defining a fulcrum about which said lever pivots, an inertial mass is attached to a first end of said lever spaced apart from said fulcrum, a roller is attached to a second end of said lever spaced apart from said fulcrum and said frictional clutch is attached to said lever at a point spaced apart from said fulcrum between said fulcrum and said second end; and
    said second flywheel is formed with a circumferentially extending inner surface, said frictional clutch faces said inner surface of said second flywheel.

12. The flywheel assembly according to claim 11, wherein said inner surface of said second flywheel is defined on an annular lip which extends axially from said second flywheel.

13. The flywheel assembly according to claim 12, further comprising:
- a pair of drive plates fixed to said first flywheel, said drive plates being spaced apart from each other and formed with engagement portions;
- said driven plate is disposed between said drive plates having a plurality of radially extending support portions formed thereon; and
- wherein said elastic member comprises a plurality of elastic members disposed between adjacent ones of said radially extending support portions and said engagement portions.

14. The flywheel assembly according to claim 13, further comprising:
- a float body mounted between said first and second flywheels for relative rotary displacement with respect to both said first and second flywheels, said float body extending radially outward between adjacent elastic members such that said two adjacent elastic members extend between said radially extending support portions with said float body separating said two adjacent elastic members.

15. The flywheel assembly according to claim 14, wherein said float body and said radially extending support portions are formed at radial outward portions with circumferentially extending limiting portions.

* * * * *